Aug. 13, 1935.　　　　　G. W. BAUGHMAN　　　　　2,010,840
GROUND DETECTING APPARATUS
Filed Oct. 15, 1931
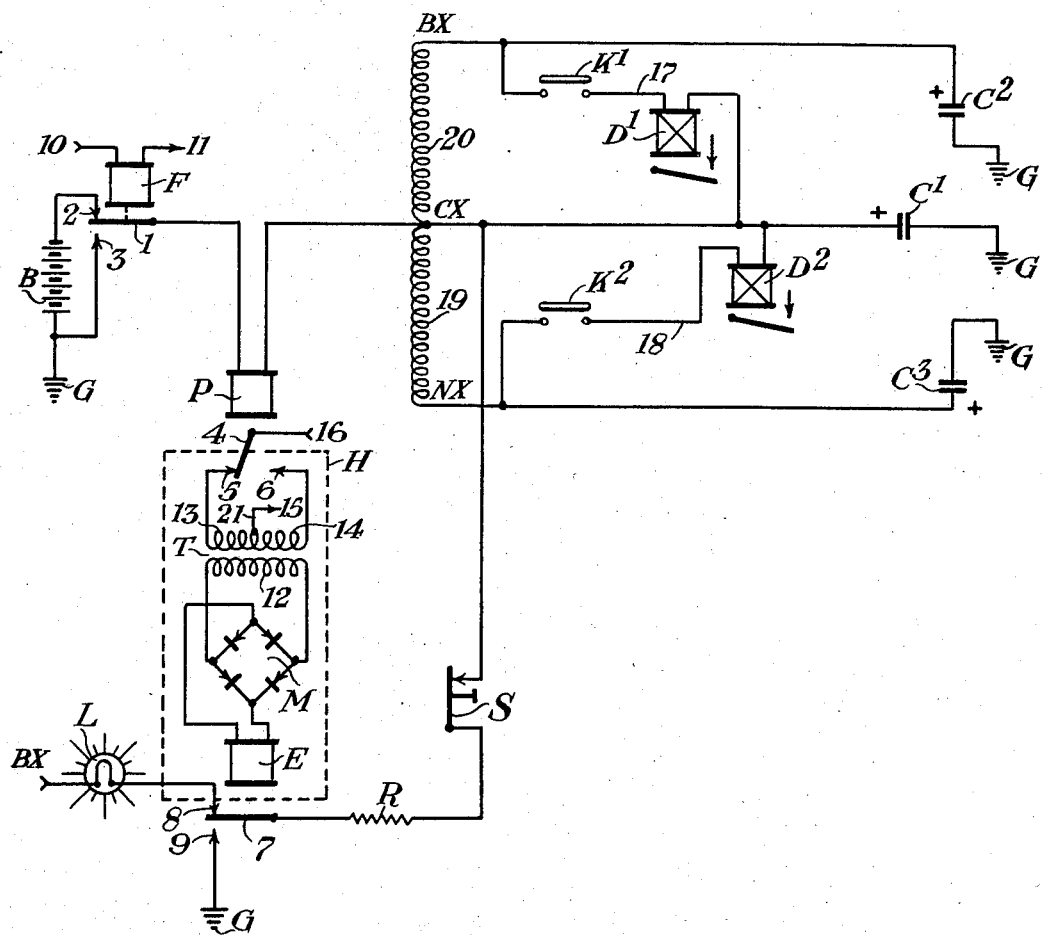
INVENTOR.
George W. Baughman
By　A. R. Vinmill
HIS ATTORNEY.

Patented Aug. 13, 1935

2,010,840

UNITED STATES PATENT OFFICE 2,010,840

GROUND DETECTING APPARATUS

George W. Baughman, Pittsburgh, Pa., assignor to The Union Switch & Signal Company, Swissvale, Pa., a corporation of Pennsylvania Application October 15, 1931, Serial No. 568,892

11 Claims. (Cl. 177—311)

My invention relates to ground detecting apparatus, and more specifically to apparatus for the detection of grounds in an alternating current transmission system.

I will describe one form of ground detecting apparatus embodying my invention, and will then point out the novel features thereof in claims.

The accompanying drawing is a diagrammatic view showing one form of apparatus embodying my invention.

In alternating current transmission systems used in railway signaling it is highly desirable to provide means for the detection of grounds on transmission wires of the system, as well as grounds on any one of the control wires associated with relays energized from said system and having the important function of governing railway signals or switches. The obvious danger is that should a ground exist on a power wire and a deenergized relay control wire at the same time, sufficient current might be fed to the relay through the ground connection to cause false operation. Since control relays of the type commonly employed in railway signaling are designed for sensitive response, due to considerations of power economy, and size of transmission equipment required, it will be apparent that not only grounds of low resistance, but also grounds of relatively high resistance may be sources of danger. It is essential, therefore, to provide ground detecting equipment not only of a high order of reliability, but also having the high degree of sensitivity required for detection of high resistance grounds.

In transmission systems wherein all wires of the system are maintained at a value of potential appreciably above that of the ground, several methods for ground detection are available, based chiefly upon the collapse or change in the above-ground potential of a grounded wire, which change is used to operate a sensitive ground detector. Where, however, it is desired to detect grounds on a wire which is normally at ground potential, the above methods fail, because a ground connection on such a wire entails no change in the potential of the wire with respect to ground. Conditions of this character may arise in connection with the return wire of the Edison three wire system, and polyphase systems employing an ungrounded neutral wire.

The present invention discloses a method for detecting grounds on wires which are normally at ground potential, as well as grounds on those wires of the system having a potential above that of the ground.

It will be understood, of course, that the potential referred to above is the power transmission potential of the line, as distinct from a testing potential which may be applied to the conductors of the line for purposes of ground detection.

Referring to the accompanying drawing in which, for simplicity, I have illustrated my invention applied to an alternating current transmission system of the Edison three wire type, the wires BX, NX and CX are the three power wires supplied from the generator or transformer windings 19 and 20, CX being the common return for the BX and NX wires. The capacities $C^1$, $C^2$ and $C^3$ represent the inherent capacity to ground of the power wires CX, BX and NX, respectively, although in cases where the inherent capacity of the wires to ground is low, as in an aerial transmission line for example, physical condenser units may be added for increasing the charging current sufficiently to cause ground detecting apparatus to respond. It will be understood that the capacities $C^1$, $C^2$ and $C^3$ include also the capacity to ground of any wires or apparatus connected, respectively, to the several power wires of the system. For simplicity, I have shown but two switch or signal control relays $D^1$ and $D^2$, although in practice a large number of these relays or control devices may be present. One terminal of each of the control relays $D^1$ and $D^2$ is permanently connected to the wire CX, the other terminal or control wire being connected through a circuit controller $K^1$ or $K^2$ to a power wire BX or NX. The controllers $K^1$ or $K^2$ may be either manually operated or governed automatically by traffic conditions, in well known manner. Governing means for these controllers are not shown as they form no part of my present invention.

Relay P is a sensitive direct current polarized relay capable of closing one or another of two contacts depending upon the direction of current flow through the relay winding. The armature 4 of relay P is biased to maintain the contact 4—5 or contact 4—6 closed in the last operated position until a current reversal through the relay winding takes place. One terminal of relay P is shown connected to wire CX, although this terminal can as well be connected with any power wire of the system, such as BX or NX. The remaining terminal of relay P is connected to a contact finger 1 operated by an actuating device F, which contact finger is capable of being connected alternately to the positive pole of a battery B and to the grounded negative pole of said battery. The actuating device F, shown as a relay, and energized from a suitable source having the terminals 10 and 11, can be any one of a large group of well known electrical or mechanical interrupting devices, such as a flasher relay or motor, the only requirement being that it operate at substantially uniform speed, providing oscillations of contact finger 1 at a rate not too rapid for the relay P to follow.

It will be apparent from the description so far given that I have provided a method for alternately charging and discharging the capacities $C^1$, $C^2$ and $C^3$, the charging currents which flow out from battery B and the discharge currents which return to the grounded terminal of this battery being superimposed upon the wires of the alternating current transmission system. The voltage of battery B is chosen sufficiently high as compared with the combined value of capacities $C^1$, $C^2$ and $C^3$, to create charge and discharge currents of sufficient magnitude to operate relay P. When contact 1—2 of device F is closed, a charging current flows from the positive terminal of battery B, contact 1—2, winding of relay P, and each of the wires CX, BX and NX in parallel, charging the respective capacities $C^1$, $C^2$ and $C^3$, with polarities as shown, to the battery potential, and causing contact 4—5 of relay P to lose. When contact 1—3 of device F becomes closed, the positive terminal of each of the multiple capacities $C^1$, $C^2$ and $C^3$ becomes connected with ground through the respective power wires, winding of relay P, and contact 1—3. The charge on each of these capacities will therefore collapse, sending a discharge current in the reverse direction through the winding of relay P, and causing contact 4—6 of this relay to become closed.

This cycle of operation will continue as long as device F continues to operate and each of the capacities $C^1$, $C^2$ and $C^3$ remains intact; that is, as long as no grounds exist on the system. Should a ground occur on any one of the wires CX, BX, NX, or any associated wires connected therewith, the capacity to ground of the grounded wire will become short-circuited, and this short-circuit path will be effective in short-circuiting the remaining multiple capacities. Assuming, for example, that a ground occurs on wire CX, a path will exist through the ground, around capacity $C^1$, and since capacities $C^2$ and $C^3$ are in multiple with capacity $C^1$, these capacities will also become short-circuited.

Under this latter condition, with contact 1—2 of device F closed, a current will flow from the positive terminal of battery B, through the winding of relay P and through the ground connection on wire CX, back through ground to the negative terminal of battery B. The capacities $C^1$, $C^2$ and $C^3$ being now short-circuited by the ground connection on wire CX, will receive no charge when contact 1—2 closes, with the result that no discharge current will flow through relay P upon the subsequent closing of contact 1—3 of device F. Relay P will therefore fail to reverse and this failure of relay P to reverse is used to provide an indication of a ground on the system.

Assuming the ground occurring on the system to be of relatively high resistance, the shunt path offered by this ground will not completely divert the current away from the capacities $C^1$, $C^2$ and $C^3$, and some charging current will be absorbed by the capacities, which current will be discharged through the relay P. However, by adjusting the potential of battery B to that value which is just sufficient to give reliable operation of relay P, or by changing the adjustment of this relay, conditions can be established such that grounds of relatively high resistance can be effectively detected, because under these conditions, a small decrease in the value of the discharge current through relay P will be sufficient to cause this relay to fail to respond. As long as the sum of the multiple capacities $C^1$, $C^2$ and $C^3$ remains substantially unchanged, the relay P will function reliably to detect grounds. Closing or opening one or more of the controllers $K^1$ or $K^2$ will operate to redistribute the capacity among the individual units $C^1$ and $C^2$, or $C^1$ and $C^3$, but the total multiple capacity of the system of wires to ground will remain unchanged, because the total capacity is determined solely by the exposed area of the wires, separation from ground, and other physical constants inherent in the system and unchanged by the operation of controllers $K^1$ or $K^2$.

The apparatus included within the broken line H is of such character that contact 7—8 of relay E is maintained in its closed condition as long as armature 4 of relay P continues to oscillate from contact 5 to contact 6 and vice-versa. Should the oscillating movement of armature 4 become interrupted, relay E will become deenergized, opening contact 7—8 and closing contact 7—9. In the particular form of apparatus illustrated, relay E is a direct current neutral relay, receiving its energy from a full-wave rectifier M, which in turn is energized from the secondary winding 12 of a transformer T. The transformer T is provided with a primary winding divided into two equal sections 13 and 14 by the tap 21 at the electrical center of the winding. When armature 4 is oscillating, direct current is supplied from the terminals 15—16 of a suitable source, alternately to sections 13 and 14 of the primary winding, inducing in well known manner an alternating potential across the terminals of secondary winding 12. The alternating potential so induced causes a unidirectional current to flow in the winding of relay E, maintaining this relay in its energized condition. Should the oscillations of armature 4 cease, a steady direct current will continue to flow in one or the other section of the primary winding of transformer T, and no alternating potential will appear across secondary winding 12, with the result that relay E will become deenergized.

As long as contact 7—8 of relay E remains closed, an indicator L, which may be either of the visual or acoustic type, will be energized and will provide an indication that the system is free from grounds. When a ground occurs on the system, causing relay E to become deenergized, indicator L will become deenergized, and contact 7—9 will close a ground path from wire CX through resistor R and a normally closed push button S. The purpose of grounding wire CX through resistor R, in the event of a ground on the system, is to provide a shunt path around any control relay such as $D^1$ or $D^2$ which may happen to have a control wire 17 or 18 grounded, in order to remove the possibility of false energization of the control relay through the medium of the accidental ground. The ohmic value of resistor R is chosen sufficiently low as compared with the impedance of a control relay to insure that sufficient current will be diverted from the relay to prevent energization. After the system has been cleared of grounds, it is necessary to depress push button S momentarily in order that capacities $C^1$, $C^2$ and $C^3$ may again become charged from battery B, and the system be restored to its normal condition.

Although I have herein shown and described only one form of ground detecting apparatus embodying my invention, it is understood that various changes and modifications may be made therein within the scope of the appended claims without departing from the spirit and scope of my invention.

Having thus described my invention, what I claim is:

1. In combination with an alternating current transmission line having capacity to ground, a source of direct current, a winding, means for alternately charging said capacity from said source in a given direction through said winding and for discharging said capacity in the reverse direction through the winding, and indicating means governed by said winding responsive to the direction of current flow therethrough.

2. In combination with an alternating current transmission line having capacity to ground, a source of direct current, a winding, means for alternately charging said capacity from said source in a given direction through said winding and for discharging said capacity in the reverse direction through the winding in continued sequence, and indicating means governed by said winding responsive to the continued alternate change in direction of the current through the winding.

3. In combination with an alternating current transmission line having capacity to ground, a source of direct current, an electroresponsive device, means for alternately charging said capacity from said source in a given direction through said device and for discharging said capacity in the reverse direction through the device, and indicating means governed by said device in accordance with the direction of current flow therethrough.

4. In combination with an alternating current transmission line having capacity to ground, a source of direct current, means including a circuit for alternately charging said capacity from said source in a given direction and for discharging said capacity, a polarized relay included in the charge and discharge circuit for said capacity and capable of assuming one condition or another according as it is energized by current flowing into or current flowing out from said capacity, and indicating means governed by said polarized relay.

5. A ground detector for an alternating current transmission system having capacity to ground comprising in combination, a source of direct current, means including a circuit for alternately charging said capacity from said source and discharging said capacity in continued sequence, a polarized relay included in the charge and discharge circuit for said capacity and capable of responding to the charging current flowing into and the discharge current flowing out from said capacity, and means governed by said polarized relay for providing an indication when said sequence of charge and discharge currents is uninterrupted.

6. In combination with an alternating current transmission line having capacity to ground, a source of direct current, means including an interrupter and a circuit for alternately charging said capacity from said source and discharging said capacity, a relay included in said circuit and energized by the charging current flowing into and discharge current flowing out from said capacity and having a contact responsive to the direction of current flow through the winding of the relay, and an indicator controlled by said contact.

7. In combination with an alternating current transmission line having capacity to ground, a source of direct current, means including an interrupter and a circuit for alternately charging said capacity from said source and discharging said capacity, a winding included in said circuit and energized by the charging current flowing into and the discharge current flowing out from said capacity, and means governed by said winding for providing one indication when said charge and discharge currents follow in sequence and another indication when said sequence is interrupted.

8. In combination with an alternating current transmission line comprising a plurality of line wires having capacity to ground, a source of direct current, means including a circuit for alternately charging said capacity from said source in a given direction and discharging said capacity in continued sequence, a detecting relay included in said circuit and energized by the charging current flowing into and discharge current flowing out from said capacity, a control relay one terminal of which is at times connected with one wire of said line through a control wire and a circuit controller and the other terminal of which is constantly connected with another wire of said line, means governed by said detecting relay and including a first contact which remains closed when and only when said charge and discharge currents follow in sequence, an indicator controlled by said first contact, and means also governed by said detecting relay and including a second contact for closing a shunt path around said control relay in the event that said charge and discharge currents do not follow in sequence.

9. In combination with an alternating current transmission line having capacity to ground, a source of direct current, means including a circuit for alternately charging said capacity from said source in a given direction and discharging said capacity in continued sequence, a polarized relay included in said circuit and energized by the charging current flowing into and the discharge current flowing out from said capacity, a transformer comprising a primary and a secondary winding, a rectifier, a direct current neutral relay connected with the secondary of said transformer through said rectifier, means controlled by said polarized relay for causing an interrupted direct current to flow in said primary winding when said charge and discharge currents follow in sequence thereby causing a voltage to be induced in said secondary winding for energizing said neutral relay, and an indicator controlled by said neutral relay.

10. In combination with an alternating current transmission line having capacity to ground, a source of direct current, means for alternately charging said capacity from said source and discharging said capacity in continued sequence, a detecting relay responsive to the direction of the flow of current through its winding, means for energizing said relay in one direction by the charging current flowing into said capacity and in the other direction by the discharge current flowing out from said capacity, an auxiliary relay, means controlled by said detecting relay for keeping said auxiliary relay energized when and only when said detecting relay is alternately energized in one direction and the other in continued sequence, an indicator controlled by a front contact of said auxiliary relay, an impedance, and means including a back contact of said auxiliary relay for connecting a wire of said transmission line with ground through said impedance.

11. In combination with an alternating current transmission line having capacity to ground, a source of direct current, means including an interrupter and a circuit for alternately charging said capacity from said source in a given direction and discharging said capacity in continued sequence, a polarized relay included in said circuit and energized by the charging current flowing into and discharge current flowing out from said capacity, a transformer comprising a primary winding divided into two sections and a secondary winding, means governed by said polarized relay for alternately supplying one of said primary sections with direct current of one polarity and the other of said primary sections with direct current of the opposite polarity according as said polarized relay is energized by said charging current or said discharge current respectively, a full-wave rectifier having its alternating current terminals connected across the secondary winding of said transformer, a direct current neutral relay connected across the direct current terminals of said rectifier, an indicator; an energizing circuit for said indicator including a normally closed circuit controller, a resistor, and a front contact of said neutral relay; and a grounding circuit for a wire of said transmission line including said circuit controller, said resistor, and a back contact of said neutral relay.

GEORGE W. BAUGHMAN.